Figure 1A:
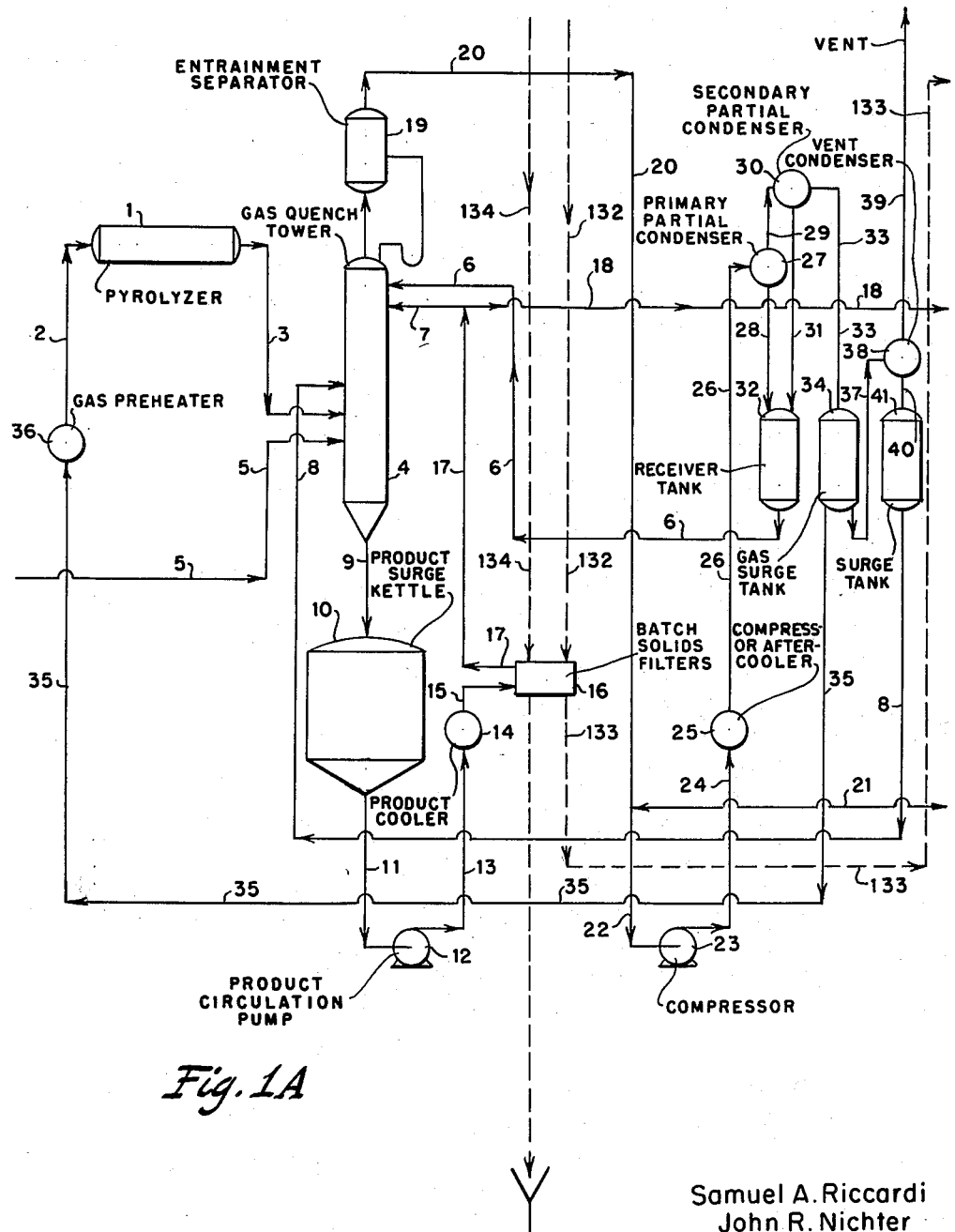
Figure 1B:
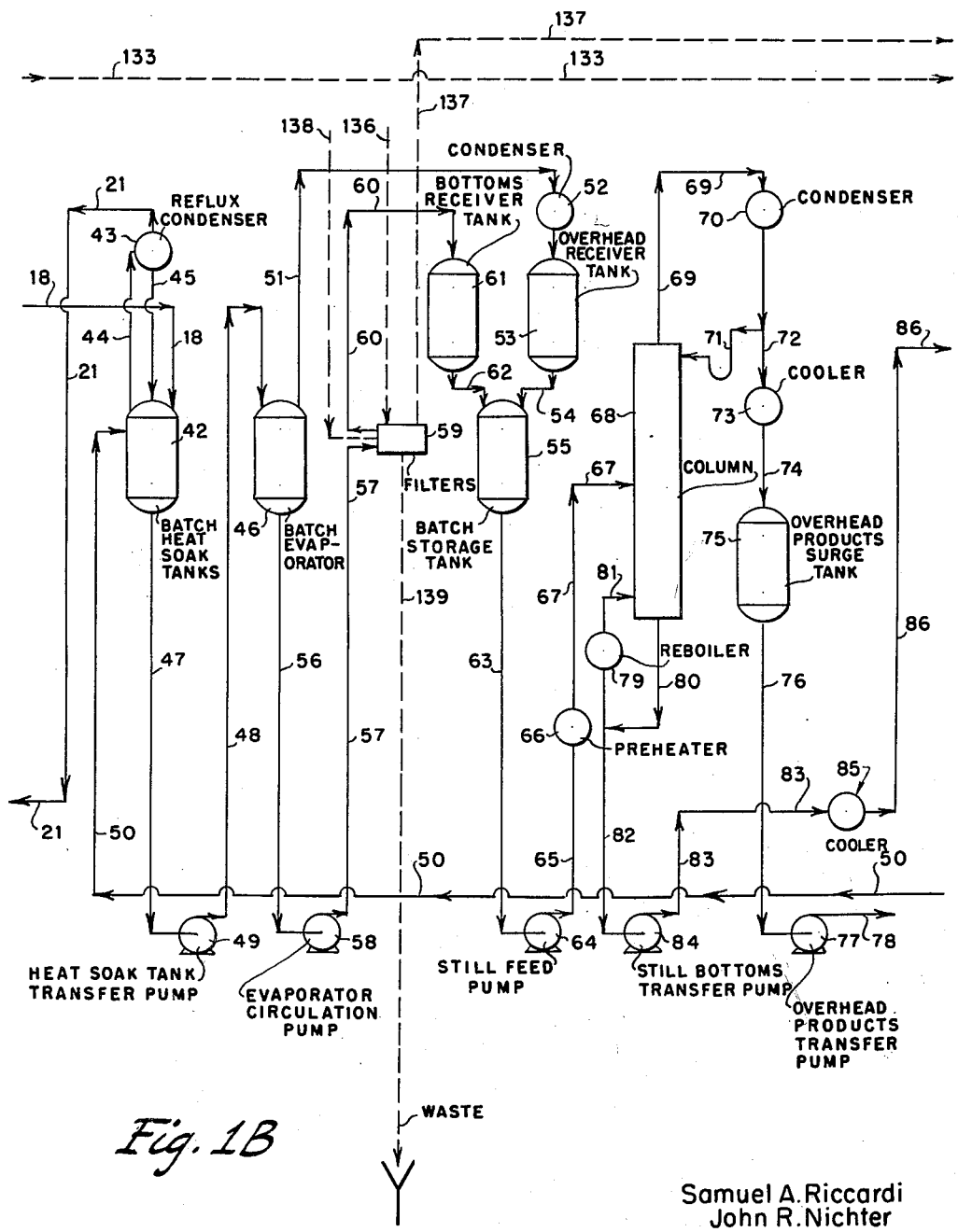
Figure 1C:
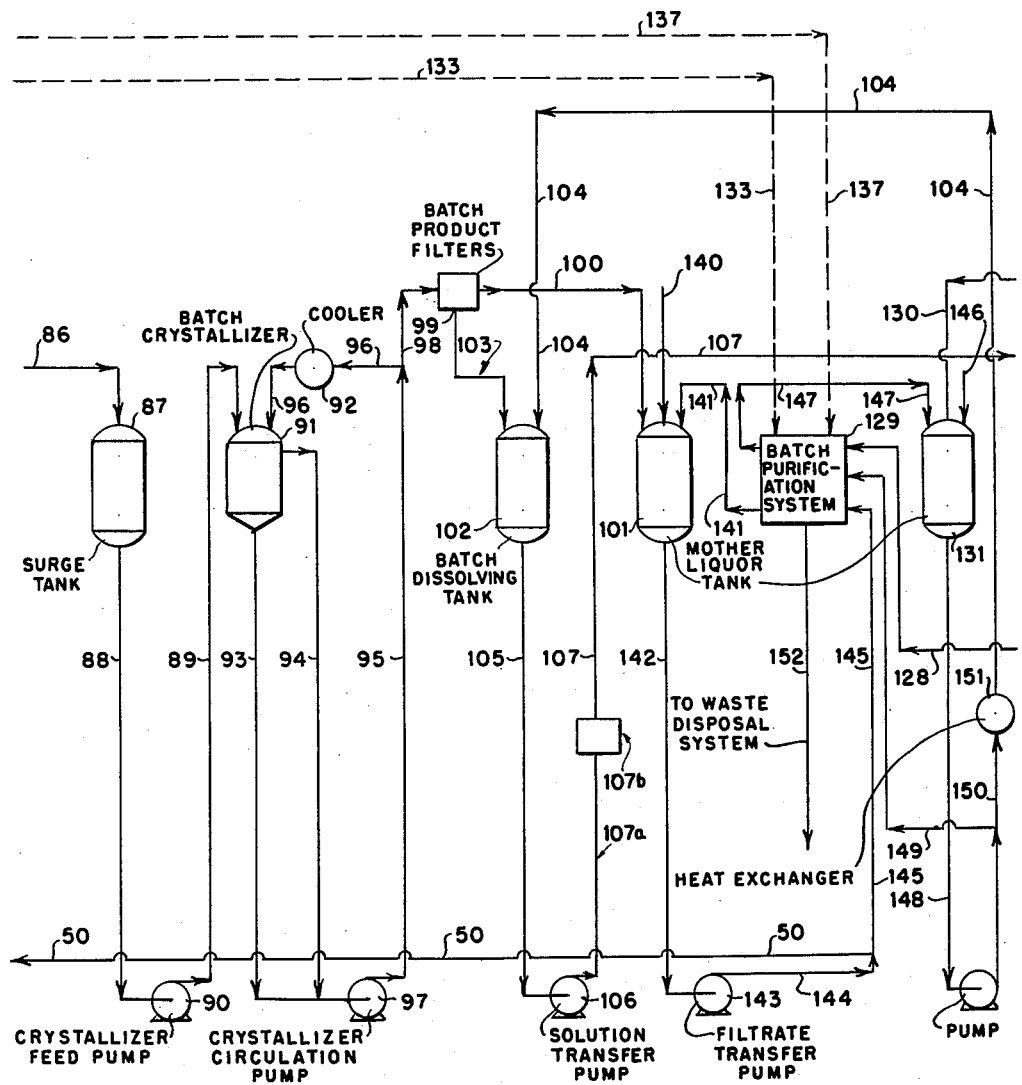
Figure 1D:
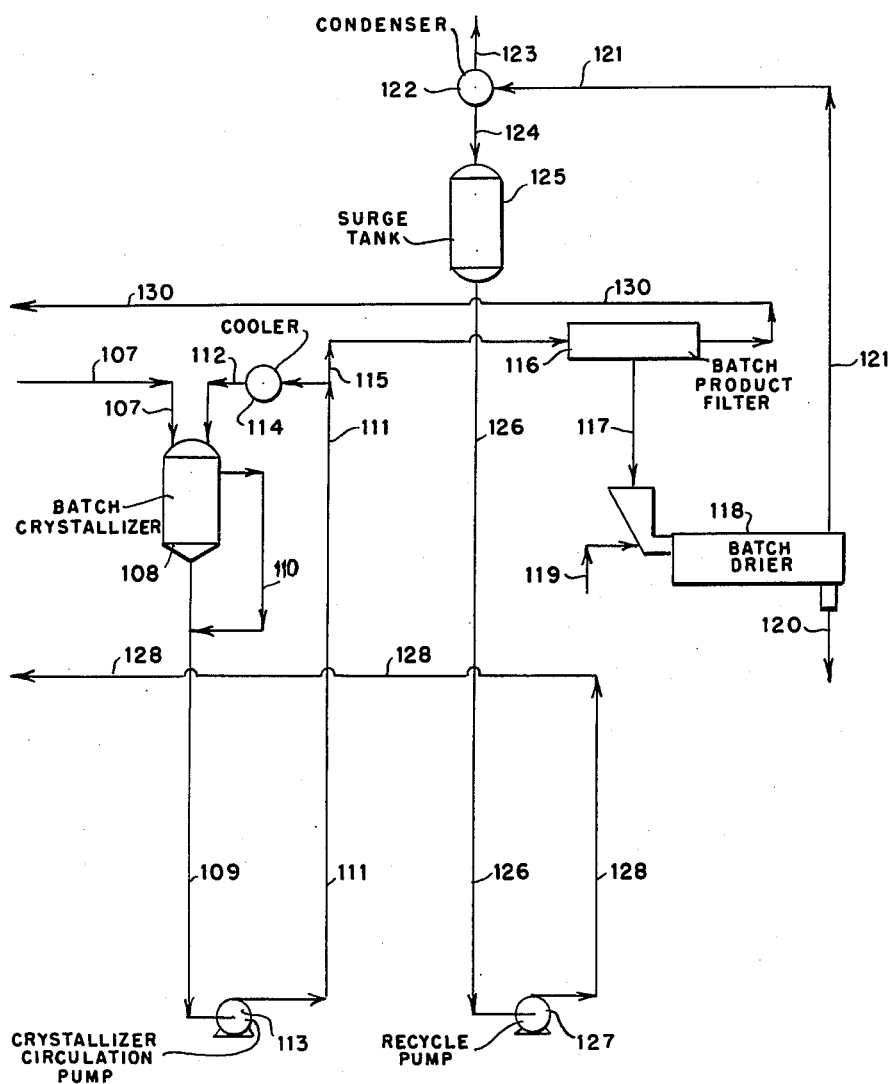

Feb. 26, 1963 S. A. RICCARDI ETAL 3,078,530
PYROLYSIS OF DIBORANE
Filed May 22, 1957 4 Sheets-Sheet 4

Samuel A. Riccardi
John R. Nichter
INVENTORS.

BY

Adams, Forward and McLean
ATTORNEYS

United States Patent Office

3,078,530
Patented Feb. 26, 1963

3,078,530
PYROLYSIS OF DIBORANE
Samuel A. Riccardi, Tonawanda, and John R. Nichter, Kenmore, N.Y., assignors to Olin Mathieson Chemical Corporation, a corporation of Virginia
Filed May 22, 1957, Ser. No. 660,983
1 Claim. (Cl. 23—204)

This invention relates to a method for the pyrolysis of diborane to produce pentaborane-9 and decaborane.

It has heretofore been proposed to pyrolyze diborane by passing it in admixture with an inert diluent gas such as hydrogen through a reaction zone maintained at approximately 200° F. to 550° F. Generally, the molar ratio of inert diluent gas to diborane has been within the range 1:1 to 10:1, the pressure has been within the range from about atmospheric pressure to 125 p.s.i.g. and the residence time has been of the order of from 0.2 to 15 seconds. Note, for example, the article by McCarty and Di Giorgio appearing on pages 3138 to 3143 of the July 1951 issue of the Journal of the American Chemical Society. When the pyrolysis is carried out, the effluent from the reaction zone generally includes tetraborane, pentaborane-9, pentaborane-11 and solids including decaborane, as well as unconverted diborane. Of the aforementioned boron hydrides, pentaborane-9 and decaborane are particularly adapted for use as intermediates in the production of fuels, as described in Altwicker et al. applications, Serial Nos. 497,407, now Patent No. 2,999,117, and 497,408, now Patent No. 3,038,012, both filed March 28, 1955. When the process is carried out in practice, however, it is found that the pyrolysis is difficult to control in order to produce maximum yield of pentaborane-9 and decaborane and particularly with a minimum production of solids other than decaborane, since such solids are not useful, represent a loss of valuable diborane and in fact present a hazardous disposal problem.

In accordance with the present invention, an improved method for the pyrolysis of diborane has been devised in order to produce pentaborane-9 and decaborane in good yield and with a minimum production of solids other than the decaborane. In addition, the method provides a convenient means whereby solids other than decaborane which are formed can be eliminated from the pyrolysis product, making the recovery of pure pentaborane-9 and decaborane considerably more convenient. Also, the method results in the production of a clean, cool gas stream partly for recycle to the pyrolysis zone and partly for passage to a zone where diborane can be recovered from admixture with the hydrogen which is produced in the pyrolysis and necessarily must be purged from the operation in order to prevent excessive build-up.

These advantages are obtained in accordance with the present process by first pyrolyzing the diborane in accordance with the reaction conditions which have heretofore generally been used in the art, namely, using a molar ratio of inert diluent gas such as hydrogen to diborane within the range 1:1 to 10:1, a temperature within the range from 200° F. to 550° F., a pressure within the range from approximately atmospheric to 125 p.s.i.g. and a residence time of from 0.2 to 15 seconds. After the pyrolysis operation has been conducted, the pyrolysis products are immediately thereafter quenched to a temperature below 100° F., preferably between 50° F. and 75° F., by contacting the pyrolysis product with a normally liquid fraction of the pyrolysis product. This contacting can be effected using a spray tower, bubble tower or other type of contacting apparatus known in the art. The most important thing is that the effluent from the reaction zone be rapidly cooled and hence, instead of using for the cooling a normally liquid fraction of the pyrolysis product, there can be employed a normally liquid lower paraffin hydrocarbon such as heptane.

The following example, which is to be taken in conjunction with the accompanying drawing of the novel process, as illustrated in FIGURES I–A, I–B, I–C, and I–D, illustrates a specific embodiment falling within the scope of this invention. The example is described with reference to FIGURES I–A, I–B, I–C, and I–D, when read sequentially from left to right, starting with FIGURE I–A then to I–B, I–C, and I–D, in that order.

*Example*

In the drawing, the numeral 1 represents a pyrolyzer into which is passed through line 2 a gaseous mixture composed of the following materials flowing at the following rates in pounds per hour: diborane, 2208; tetraborane, 3.8; and hydrogen, 483. The mixture passing through line 2 is at 300° F. and at a pressure of 100 p.s.i.g. Pyrolyzer 1 is a jacketed bundle of reaction tubes provided with a circulating heat transfer medium to control the reaction temperature, and the pyrolyzer is of such size as to provide a residence time of 5 seconds, based upon the input of diborane calculated at standard conditions of temperature and pressure. Through line 3, the exit line from the pyrolyzer, there passes a mixture having a temperature of 392° F. and a pressure of 50 p.s.i.g. and which is composed of the following materials flowing at the following rates in pounds per hour: diborane, 1656; tetraborane, 16.3; pentaborane-9, 403; pentaborane-11, 12.0; decaborane, 49; solids other than decaborane, 25; and hydrogen, 553.

The materials flowing through line 3 enter gas quench (spray) tower 4, into which by means of line 5 there is also introduced 565 pounds per hour of fresh liquid diborane having a temperature of —4° F. and a pressure of 245 p.s.i.g. Also into gas quench tower 4 there is introduced through line 6 a mixture composed of the following materials flowing at the following rates in pounds per hour: diborane, 36; tetraborane, 16; pentaborane-9, 60; and pentaborane-11, 2.3. This mixture is at a temperature of —52° F. and at a pressure of 100 p.s.i.g. Furthermore, through line 7 and into gas quench tower 4, there is introduced a stream composed of a mixture of the following materials flowing at the following rates in pounds per hour: diborane, 645; tetraborane, 692; pentaborane-9, 17,279; pentaborane-11, 512; decaborane, 2093; and solids other than decaborane, 213. This stream passing through line 7 is at a temperature of —31° F. and at a pressure of 50 p.s.i.g. In addition, through line 8 there is introduced into gas quench tower 4 a stream composed of the following materials flowing at the following rates in pounds per hour: biborane, 259; and tetraborane, 0.2. This stream is at a temperature of —257° F. and at a pressure of 100 p.s.i.g. The origin of the streams passing through lines 6, 7 and 8 will be explained hereinafter.

From the bottom of gas quench tower 4 through line 9 there is withdrawn a mixture composed of the following materials flowing at the following rates in pounds per hour: diborane, 660; tetraborane, 704.5; pentaborane-9, 17,682; pentaborane-11, 524; decaborane, 2142; and solids other than decaborane, 238. This mixture, which is at a temperature of 62° F. and at a pressure of 50 p.s.i.g., enters product surge kettle 10, and from thence by means of line 11, product circulation pump 12 and line 13 is passed through product cooler 14, wherein the temperature of the mixture is reduced to —31° F., the pressure upon leaving product cooler 14 being 65 p.s.i.g.

The material cooled in product cooler 14 passes by means of line 15 into batch solids filters 16, wherein solids are separated and from which mother liquor passes by means of lines 17 and 7 back into gas quench tower 4. The batch solids filters 16 are arranged in parallel so that some can be undergoing cleaning while others are on-stream. The mixture passing through line 17 is composed of the following materials flowing at the following rates in pounds per hour: diborane, 660; tetraborane, 704.5; pentaborane-9, 17,682; pentaborane-11, 524; decaborane, 2142 and solids other than decaborane, 218. The mixture passing through line 17 is at a temperature of −31° F. and at a pressure of 50 p.s.i.g.

It will be noted that the stream passing through line 17 is split into a stream passing through line 7 and a stream passing through line 18. The stream passing through line 18 is composed of a mixture of the following materials flowing at the following rates in pounds per hour: diborane, 15; tetraborane, 12.5; pentaborane-9, 403; pentaborane-11, 12.0; decaborane, 49; and solids other than decaborane, 5. This stream passing through line 18 is at a temperature of −31° F. and at a pressure of 50 p.s.i.g.

The overhead gases from the gas quench tower 4 pass through entrainment separator 19, and through line 20 there passes a gaseous mixture composed of the following materials flowing at the following rates in pounds per hour: diborane, 2501; tetraborane, 20; pentaborane-9, 60; pentaborane-11, 2.3; and hydrogen, 533. This mixture is at a temperature of −22° F. and at a pressure of 50 p.s.i.g. The stream passing through line 20 is joined by a stream flowing through line 21 composed of a gaseous mixture of diborane and hydrogen flowing at the average rates of 2 pounds per hour and 7 pounds per hour, respectively. The stream passing through line 22 is compressed by means of compressor 23 to 100 p.s.i.g., the temperature of the compressed mixture passing through line 24 then being 104° F. The compressed mixture passes by means of line 24 through compressor after-cooler 25, wherein the temperature is reduced so that the temperature of the material passing through line 26 is 40° F. The mixture passing through line 26 enters primary partial condenser 27, from the bottom of which through line 28 there is withdrawn a liquid stream composed of a mixture flowing at the following rates in pounds per hour: diborane, 14; tetraborane, 9; pentaborane-9, 53; and pentaborane-11, 2.0. This mixture is at −40° F. and at a pressure of 100 p.s.i.g. Overhead from primary partial condenser 27 through line 29 there is withdrawn a gaseous mixture composed of the following materials flowing at the following rates in pounds per hour: diborane, 2489; tetraborane, 11; pentaborane-9, 7; pentaborane-11, 0.3; and hydrogen, 540. This mixture enters secondary partial condenser 30 from which there is withdrawn through line 31 a liquid mixture composed of the following materials flowing at the following rates in pounds per hour: diborane, 22; tetraborane, 7; pentaborane-11, 0.3 and pentaborane-9, 7. This mixture flowing through line 31 is at a temperature of −76° F. and at a pressure of 100 p.s.i.g. Streams 28 and 31 enter receiver tank 32, from the bottom of which the stream passing through line 6 is withdrawn.

Overhead from secondary partial condenser 30 and through line 33 and into gas surge tank 34 there flows a gaseous mixture composed of the following materials flowing at the following rates in pounds per hour: diborane, 2467; tetraborane, 4; and hydrogen, 540. A portion of the gas entering gas surge tank 34 is withdrawn by means of line 35 and enters gas preheater 36, wherein the temperature is raised from −76° F. to 300° F. The remainder passes by means of line 37 into vent condenser 38, the mixture passing through line 37 being composed of the following materials flowing at the following rates in pounds per hour: diborane, 259; tetraborane, 0.2; and hydrogen, 57. Vent condenser 38 is cooled by means of liquid nitrogen in order to prevent diborane from leaving the system along with hydrogen gas, which must be vented inasmuch as hydrogen is produced in the pyrolysis operation. The vented hydrogen passes through line 39 and amounts to 57 pounds per hour at a temperature of −257° F. and at a pressure of 100 p.s.i.g. From the bottom of vent condenser 38 and through line 40, there is withdrawn a liquid stream composed of the following materials flowing at the following rates in pounds per hour: diborane, 259; and tetraborane, 0.2. This stream, at a temperature of −257° F. and at a pressure of 100 p.s.i.g. enters surge tank 41 from the bottom of which it is withdrawn through line 8 and returned to gas quench tower 4.

When the pyrolysis process is carried out, tetraborane and pentaborane-11 are produced as well as the desired pentaborane-9 and decaborane, and the tetraborane as well as the pentaborane-11 and decaborane should be separated from the desired products. This is achieved by batch heating of the pentaborane-9 and the decaborane for a period of approximately 0.5 to 3 hours at a temperature of approximately 130° F. Thus, the numeral 42 represents a series of batch heat soak tanks each of which has a capacity of approximately 100 gallons. The mixture passing through line 18 is charged to the batch heat soak tanks 42, and when heat soaking a given batch the material therein is refluxed at 130° F. and at a pressure of 5 p.s.i.g. for a period of one hour. Reflux condenser 43 is provided for this purpose, together with vapor line 44 to the reflux condenser and liquid return line 45 to the batch heat soak tanks 42. Thus, on the average, through line 44 there passes a vapor mixture composed of the following materials flowing at the following rates in pounds per hour: diborane, 2; pentaborane-9, 1209; and hydrogen, 7. On the average, the material flowing through line 45 is liquid pentaborane-9 flowing at the rate of 1209 pounds per hour. The temperature of this liquid pentaborane, as a result of the cooling in reflux condenser 43, is 50° F.

Upon the completion of each heat soak batch run the contents of a given tank 42 are pumped to batch evaporator 46 by means of lines 47 and 48 and heat soak tank transfer pump 49. The stream passing through line 47 contains an appreciable quantity of solids which may coat the tanks 42 and plug pump 49 and lines 47 and 48. Therefore, after the product has been transferred from a given tank 42, a stream is introduced into the tank from line 50 in order to flush it out. This stream is composed of the following materials flowing at the following rates in pounds per hour at the average: cyclohexane, 1690; and decaborane, 106. The stream is at a temperature of 50° F. The cyclohexane-decaborane mixture introduced into the batch heat soak tanks 42 is also transferred to batch evaporator 46 by means of lines 47 and 48 and pump 49.

The purpose of batch evaporator 46 is to precipitate a major portion of the dissolved solids present in the crude product. During the batch evaporation, approximately ⅔ of the pentaborane-9 introduced into the batch evaporator is vaporized overhead, through line 51, condensed in condenser 52 and collected in overhead receiver tank 53. Thus, through line 51 there flows a vapor mixture composed of the following materials flowing at the following rates in pounds per hour: pentaborane-9, 250; and cyclohexane, 315. This mixture is at a temperature of 104° F. and at a pressure of 5 p.s.i.g. Condenser 52 liquefies the vapor by cooling it to a temperature of 150° F. Using line 54 the material in overhead receiver tank 53 is transferred to batch storage tank 55.

The bottoms from batch evaporator 46 containing the undissolved solids are then pumped by means of lines 56 and 57 and evaporator circulation pump 58 to a series of filters 59 which are arranged in parallel in order that some can be onstream while others are being cleaned. Through line 56 there flows a mixture of the following materials at the following rates in pounds per hour: pentaborane-9, 125; decaborane, 155; solids other than decaborane, 63.5; and cyclohexane, 1375. This stream is at a temperature of 194° F. and at a pressure of 5 p.s.i.g. Through line 60 and into bottoms receiver tank 61 and from thence by means of line 62 into batch storage tank 55 there flows a stream composed of the following ingredients flowing at the following rates in pounds per hour: pentaborane-9, 125; decaborane, 155; solids other than decaborane, 2 and cyclohexane, 1359. This stream is at a temperature of 194° F.

The pentaborane-9 is separated from the decaborane and cyclohexane in a continuous fractionation operation. Thus, through line 63 there flows a stream composed of the following materials flowing at the following rates in pounds per hour: pentaborane-9, 375; decaborane, 155; solids other than decaborane, 2 and cyclohexane, 1674. This stream is at a temperature of 178° F. and at about atmospheric pressure. The mixture flowing through line 63 is pumped by means of still feed pump 64 and line 65 through preheater 66 wherein the temperature is raised to 183° F. and from the preheater by means of line 67 into column 68. Column 68 is an efficient fractionating column and is operated at approximately atmospheric pressure with a reflux ratio of approximately 10:1. Overhead from column 68 by means of line 69 there flows substantially pure pentaborane-9 vapor at the rate of 4125 pounds per hour. This vapor stream is at a temperature of 150° F. and is condensed by means of condenser 70. Reflux returns to column 68 by means of line 71 and the remainder of the pentaborane flowing through line 69 passes by means of line 72 to cooler 73 wherein the temperature of the liquid pentaborane-9 is reduced to 100° F. From cooler 73 the pentaborane-9 product passes by means of line 74 to overhead product surge tank 75 and from thence by means of line 76, overhead products transfer pump 77 and line 78 is transferred to storage. Pentaborane-9 passes through line 78 at the rate of 375 pounds per hour.

Column 68 is provided with reboiler 79 and appropriate lines 80 and 81 to maintain proper bottom operating conditions. Through lines 82 and 83, by means of still bottoms transfer pump 84 there passes to still bottoms cooler 85 a stream composed of the following materials flowing at the following rates in pounds per hour: pentaborane-9, a trace; decaborane, 155; solids other than decaborane, 2; and cyclohexane, 1674. This mixture is at a temperature of 200° F. Passing through still bottoms cooler 85 the temperature of the mixture is reduced to 100° F. By means of line 86 the mixture fed to cooler 85 is transferred to surge tank 87 and from thence by means of lines 88 and 89 and crystallizer feed pump 90 to batch crystallizer 91. In batch crystallizer 91 the temperature of the mixture is reduced to 50° F., so that a slurry is produced. The cooling is effected by cycling a material from crystallizer 91 through cooler 92 by means of lines 93, 94, 95 and 96 and crystallizer circulation pump 97. Through line 98 and into batch product filter 99 there flows a slurry composed of the following materials flowing at the following rates in pounds per hour: decaborane, 155; solids other than decaborane, 2; and cyclohexane, 1674. This stream is at a temperature of 50° F. Solids are separated out in filters 99 and mother liquor flows by means of line 100 into mother liquor tank 101. This mother liquor is a solution composed of decaborane and cyclohexane flowing at the rates of 107.4 and 1625 pounds per hour, respectively.

Filters 99 are arranged in parallel, so that some can be used for the purpose of separating solids while others are being cleaned. To accomplish the cleaning, the cake in the filters 99 is blown with the aid of nitrogen gas into batch dissolving tank 102 through line 103. Thus, through line 103 there passes a cake composed of the following materials flowing at the following average rates in pounds per hour: decaborane, 47.6; solids other than decaborane, 2; and cyclohexane, 49. Into tank 102 through line 104 there is also introduced a stream of pentane containing a small amount of decaborane. Thus, this stream is composed of the following materials flowing at the following rates in pounds per hour and is at a temperature of 62° F.: decaborane, 0.6; pentaborane, 2350 and cyclohexane, 47. In tank 102 the pentane introduced by means of line 104 serves to dissolve the decaborane, so that through line 105 there passes a liquid solution composed of the following materials flowing at the following rates in pounds per hour: decaborane, 48.2; solids other than decaborane, 2; cyclohexane, 96; and pentane, 2350. This stream is at a temperature of 62° F. Pump 106 and line 107a serve to transfer this stream to filter 107b from which solids other than decaborane are removed. The filtrate from filter 107b is conducted to batch crystallizer 108 by means of line 107. This stream is composed of the following materials flowing at the following rates in pounds per hour: decaborane, 48.2; cyclohexane, 96 and pentane, 2346. The temperature of the mixture in the batch crystallizer 108 is reduced to —4° F. to provide a slurry.

Similarly to crystallizer 91, crystallizer 108 is provided with lines 109, 110, 111 and 112 and with pump 113 and cooler 114 to effect the desired cooling. As a result of the cooling, through line 115 there passes a slurry at —4° F. of the following materials flowing at the following rates in pounds per hour: decaborane, 48.2; cyclohexane, 96; and pentane, 2346. This slurry passes into batch product filter 116, from which a decaborane cake composed of 47 pounds per hour of decaborane, 45 pounds per hour of pentane, and 2 pounds per hour of cyclohexane passes by means of line 117 into batch drier 118. The drying material employed in drier 118 is nitrogen gas introduced through line 119, dried decaborane in the amount of 47 pounds per hour at 150° F. being removed through conduit 120. Nitrogen gas introduced through line 119 as well as pentane introduced through line 117 pass overhead from drier 118 by means of line 121 into condenser 122, from which overhead nitrogen gas is purged through line 123 and from which a liquid stream is withdrawn by means of line 124. The stream passing through line 124 is composed of approximately two pounds per hour of cyclohexane and 45 pounds per hour of pentane, the stream being at a temperature of 77° F. This stream passes through surge tank 125 and line 126 and by means of recycle pump 127 is transferred through line 128 to batch purification system 129, which is a series of conventional fractionating columns. The mother liquor from batch product filter 116 passes by means of line 130 to mother liquor tank 131. This stream is composed of the following materials flowing at the following rates in pounds per hour and is at a temperature of —4° F.: decaborane, 1.2; cyclohexane, 94; and pentane, 2301.

The above description sets forth in detail the steps whereby desired pentaborane-9 and decaborane are recovered. There are certain other features of the process which merit description, however. Thus, returning to the batch solids filters 16, the wet cake present is then advisedly handled in the following manner. The wet cake is first washed with fresh cyclohexane introduced through line 132, the cyclohexane upon passing through the wet cake then going by means of line 133 to batch purification system 129. After the cake has been washed with cyclohexane, it is then back washed with kerosene introduced through line 134. The kerosene employed in the back washing is passed to waste by means of line 135. After this has been done, the filter can be cleaned by removing the solids present therein. These precautions are advisable because of the pyrophoric condition of the liquid and solids present in the filter. Filters 59 are handled similarly. Thus, those filters are first washed with fresh cyclohexane introduced through line 136, this cyclohexane then being transferred by means of line 137 to the batch purification system 129, and thereafter back washed with kerosene which is introduced by means of line 138 and passed to waste by means of line 139.

Through line 140 and into cyclohexane mother liquor tank 101 there is introduced 55 pounds per hour of fresh cyclohexane from storage. Also into tank 101 through line 141 there is introduced from the batch purification system 129 a stream composed of the following materials flowing at the following rates in pounds per hour: decaborane, 9.2; and cyclohexane, 179. This stream has a temperature of 50° F. From this bottom of tank 101 through line 142 there is withdrawn a stream having a temperature of 50° F. composed of the following materials flowing at the following rates in pounds per hour: decaborane, 116.6; and cyclohexane, 1859. This stream is transferred by means of pump 143 and line 144 into line 50 and also into line 145, the latter being in the nature of recycle batch purification system 129.

Into mother liquor tank 131 there is introduced from storage through line 146 a stream of fresh pentane flowing at the rate of 4 pounds per hour, and there is also introduced through line 147 from batch purification system 129 a stream of liquid pentane having a temperature of 50° F. and flowing at the rate of 2395 pounds per hour. From the bottom of tank 131 there is withdrawn through line 148 a liquid stream which is divided into stream 149 and stream 150. Stream 149 is passed to batch purification system 129 and is composed of the following materials flowing at the following rates in pounds per hour: decaborane, 0.6; pentane, 2350; and cyclohexane, 47. Stream 149 has a temperature of −4° F. Stream 150 is composed of the following materials flowing at the following rates in pounds per hour: decaborane, 0.6; pentane, 2350; and cyclohexane, 47. In heat exchanger 151 the temperature of this stream is raised from −4° F. to 62° F. Through line 152 there is withdrawn a waste stream from batch purification system 129. This stream is composed approximately of the following materials flowing at the following rates in pounds per hour: decaborane, 2 and cyclohexane, 39. The temperature of this stream is about 50° F.

It is claimed:

In the vapor phase pyrolysis of diborane to produce pentaborane-9 and decaborane, the steps of heating the diborane in admixture with from 1 to 10 moles of hydrogen per mole of diborane at a temperature within the range from 200° F. to 550° F., at a pressure of from 0 to 125 p.s.i.g. and at a residence time of from 0.2 to 15 seconds, and thereafter rapidly quenching the reaction product to a temperature below 100° F. by contacting it with a countercurrent spray of a normally liquid fraction of the pyrolysis product in a spray tower, and separating penetaborane-9 and decaborane from the pyrolysis product.

References Cited in the file of this patent
UNITED STATES PATENTS

| | | |
|---|---|---|
| 2,642,338 | Pike | June 16, 1953 |
| 2,744,810 | Jackson | May 8, 1956 |

OTHER REFERENCES

McCarty et al.: "J. Am. Chem. Soc.," vol. 73, pages 3138–3143, July 1951.